UNITED STATES PATENT OFFICE.

FRANK A. GOOCH, OF NEW HAVEN, CONNECTICUT.

FLUX FOR SOLDERING ALUMINIUM.

SPECIFICATION forming part of Letters Patent No. 597,112, dated January 11, 1898.

Original application filed March 26, 1895, Serial No. 543,258. Divided and this application filed March 3, 1896. Serial No. 581,721. (No specimens.)

*To all whom it may concern:*

Be it known that I, FRANK A. GOOCH, of the city of New Haven, in the county of New Haven and State of Connecticut, have invented certain new and useful Improvements in Fluxes for Soldering Aluminium; and I do hereby declare the following to be a full, clear, and exact description of the invention, such as will enable others skilled in the art to which it appertains to make and use the same, this being a division of the application filed by me March 26, 1895, Serial No. 543,258.

My invention relates to the preparation of a surface of solid aluminium for soldering. It is well known that it is difficult to solder aluminium either to another piece of aluminium or to other metal. One of the chief difficulties is due to the presence upon the surface of the aluminium of the thin film of oxid of aluminium, which prevents a close and intimate contact between the aluminium and the metals in the solder applied to the aluminium in a state of fusion. This coating is refractory and not usually dissolved by ordinary fluxes.

My invention has for its object the application to the surface of aluminium which is to be joined of a suitable flux which will dissolve the aluminium oxids and which will also enable the solders in ordinary use—as, for example, the so-called "lead" solders—to be employed for the soldering of aluminium. Metallic fluorids in a state of fusion possess the power to dissolve aluminium oxid more or less freely; but most metallic fluorids are unfit for application in a state of fusion to metallic aluminium for the purpose of removing the film of oxid because their fusing-points are higher than that of aluminium. I have found, however, that mixtures of metallic fluorids with many other suitable substances may be made, which, while fusing at temperatures below the fusing-point of aluminium, possess the property in the state of fusion of cleaning the surface of the aluminium and protecting it from atmospheric oxidation, while at the same time forming a coating upon the surface of the aluminium, which facilitates the use of solders not otherwise available.

In general terms my invention consists in a new and useful flux for use in soldering aluminium, being a mixture composed of the fluorid of a metal not reducible from such fluorid by aluminium and the halogen salt of a metal reducible from such salt by aluminium. I use the word "halogen" in the usual sense to include chlorin, bromin, iodin, and fluorin. In the use of such a flux the metal reduced in the fusing of the flux upon the aluminium will, if it is capable of union with the aluminium, form a coating or superficial alloy upon the surface of aluminium prepared to receive it by the cleansing and protecting action of the flux. The metallic salt which I prefer to use in connection with the fluorid of the metal not reducible from such fluorid by aluminium is a halogen salt of zinc, preferably the chlorid of zinc, which is readily reducible by aluminium, the zinc forming an alloy with aluminium. One of the best fluxing mixtures which I have employed in my process herein described is made by melting together the fluorid of aluminium and the fluorid of sodium with anhydrous zinc chlorid. The best results are obtained by employing the mineral cryolite with the anhydrous zinc chlorid in the proportion of fifteen per cent. of cryolite to eighty-five per cent. of zinc chlorid. In the use of the mixtures containing the zinc chlorid the surface of the aluminium is cleaned and protected from atmospheric oxidation, while the zinc is reduced from the zinc chlorid by the action of aluminium and alloys the surface of the aluminium. Should any other metal or alloy capable of combining with the aluminium be present in the solder during the fusion of the fluxing mixture containing the reducible zinc chlorid or be fused subsequently upon the surface of the metal prepared and protected by the fusion of the fluxing mixture containing the zinc chlorid, such metal or alloy will, if it is capable of such union, be united directly with the alloy of zinc and aluminium, and so with the aluminium. In this manner certain metals or alloys which do not adhere strongly to aluminium directly may be made to adhere by the intervention of the metallic coating or alloy produced by the metal reduced from the fluxing mixture. The so-called "lead" solders, for example, do not unite readily or make strong joints with aluminium; but I have found it possible to secure the adhesion of such solders—as, for example, ordinary plumbers' solder—to aluminium by applying them to a surface of aluminium prepared by treatment with the above-mentioned mixtures containing the fluorid of a metal not reducible from such fluorid by aluminium and the chlorid of zinc.

I make use of such a mixture for the purpose mentioned above by simply fusing it upon that part of the surface of the aluminium which is to be joined, either to another surface of aluminium or to the surface of some other metal, and at the same time or subsequently fusing upon the surface of aluminium thus prepared the desired solder, which may be any solder capable of making a firm joint with aluminium, the surface of which is chemically clean, either by direct union with the aluminium or by union with the alloy of aluminium and zinc or other metal reduced from the halogen salt by the aluminium, such alloy being previously formed by fusing the flux upon the surface of the aluminium, as hereinbefore described. While the solder is in a state of fusion the two pieces of metal to be joined are brought together, when a firm joint will be formed, or the two pieces of metal may first be placed in such relative positions as is desired in the joint and the mixture thinly spread along the line of desired juncture. Then, the flux or mixture being heated to a state of fusing upon the aluminium, I fuse the solder upon it in the ordinary way. A blowpipe, Bunsen burner, or a hot soldering-bolt may be used successfully as the source of heat, and the solder may be spread, if necessary, upon the prepared surface of the aluminium by the soldering-bolt or, in case the blowpipe or burner is used as a source of heat, by means of a thin iron rod or other prepared tool.

I find it convenient to employ the fluxing mixture in the form of sticks cast from the fused mixture of the materials composing it, and when the fluxing mixture is caustic or deliquescent I cover it with a coating of melted paraffin or other similar easily-fusible material which, upon cooling, protects it from the action of the air and makes it fit to be handled freely.

Having described my invention, what I claim, and desire to secure by Letters Patent, is—

1. As a flux for use in soldering aluminium, a mixture composed of the fluorid of a metal not reducible from such fluorid by aluminium, and of a halogen salt of a metal reducible from such salt by aluminium, substantially as described.

2. As a flux for use in soldering aluminium, a mixture composed of the fluorid of a metal not reducible from such fluorid by aluminium, and a halogen salt of zinc, substantially as described.

3. As a flux for use in soldering aluminium, a mixture composed of the fluorid of aluminium and the chlorid of zinc, substantially as described.

4. As a flux for use in soldering aluminium, a mixture composed of the fluorid of aluminium, the fluorid of sodium and the chlorid of zinc, substantially as described.

5. As a flux for use in soldering aluminium, a mixture composed of cryolite and the anhydrous chlorid of zinc, substantially as described.

FRANK A. GOOCH.

Witnesses:
D. ALBERT KREIDER,
ALTON W. PEIRCE.